(12) United States Patent
Gustafsson et al.

(10) Patent No.: US 8,566,493 B2
(45) Date of Patent: Oct. 22, 2013

(54) INTERRUPT CONTROLLER AND METHODS OF OPERATION

(75) Inventors: Harald Gustafsson, Lund (SE); Ulf Morland, Åkarp (SE); Per-Inge Tallberg, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 185 days.

(21) Appl. No.: 13/063,674

(22) PCT Filed: Aug. 28, 2009

(86) PCT No.: PCT/EP2009/061140
§ 371 (c)(1),
(2), (4) Date: Apr. 7, 2011

(87) PCT Pub. No.: WO2010/028964
PCT Pub. Date: Mar. 18, 2010

(65) Prior Publication Data
US 2011/0213906 A1    Sep. 1, 2011

Related U.S. Application Data

(60) Provisional application No. 61/096,362, filed on Sep. 12, 2008.

(30) Foreign Application Priority Data

Sep. 12, 2008  (EP) .................................. 08164204

(51) Int. Cl.
*G06F 13/24*  (2006.01)
(52) U.S. Cl.
CPC ..................... *G06F 13/24* (2013.01)
USPC ......................... 710/261; 710/262

(58) Field of Classification Search
USPC ........................................................ 710/262
See application file for complete search history.

(56) References Cited

U.S. PATENT DOCUMENTS

| | | | |
|---|---|---|---|
| 7,054,972 B2 * | 5/2006 | Parry et al. ..................... | 710/260 |
| 7,089,338 B1 * | 8/2006 | Wooten et al. ................ | 710/110 |
| 7,093,036 B2 * | 8/2006 | Raghunath et al. ............ | 710/48 |
| 7,444,451 B2 * | 10/2008 | Wang et al. .................... | 710/266 |
| 7,694,055 B2 * | 4/2010 | Orita et al. .................... | 710/260 |
| 7,752,365 B2 * | 7/2010 | Taylor et al. .................. | 710/110 |
| 7,761,637 B2 * | 7/2010 | Deshpande et al. .......... | 710/260 |
| 8,112,555 B2 * | 2/2012 | Anand et al. .................... | 710/15 |
| 2006/0064529 A1 * | 3/2006 | Anand et al. .................. | 710/260 |
| 2007/0088888 A1 * | 4/2007 | Orita et al. .................... | 710/260 |
| 2007/0260794 A1 * | 11/2007 | Ashish et al. ................. | 710/267 |
| 2008/0147946 A1 * | 6/2008 | Pesavento et al. ............ | 710/265 |
| 2009/0234998 A1 * | 9/2009 | Kuo .............................. | 710/110 |

(Continued)

FOREIGN PATENT DOCUMENTS

EP        0689144 A1    12/1995

*Primary Examiner* — Ryan Stiglic
(74) *Attorney, Agent, or Firm* — Coats & Bennett, P.L.L.C.

(57) ABSTRACT

Methods of operation and interrupt controllers for generating interrupt signals to a unit, which could enter an active mode and a non-active mode, are disclosed. The interrupt controllers have interrupt logic (204) adapted for receiving requests for interrupt, activity mode logic (202) adapted for receiving information whether the unit is in non-active mode, and delay control logic (203) adapted for delaying the interrupt to the unit when the received information indicates that the unit is in non-active mode.

15 Claims, 9 Drawing Sheets

(56) References Cited

U.S. PATENT DOCUMENTS

| | | | |
|---|---|---|---|
| 2009/0248932 A1* | 10/2009 | Taylor et al. | 710/110 |
| 2010/0274938 A1* | 10/2010 | Anand et al. | 710/263 |
| 2011/0016246 A1* | 1/2011 | Hiroki | 710/262 |
| 2011/0016247 A1* | 1/2011 | Ohmasa | 710/264 |
| 2011/0087815 A1* | 4/2011 | Kruglick | 710/260 |
| 2011/0113171 A1* | 5/2011 | Radhakrishnan et al. | 710/110 |

* cited by examiner

| Source | Target | Min | Max |
|--------|--------|-----|-----|
| HWB1 | INT OUT 2 | 700 | 900 |
| HWB1 | INT OUT 1 | 300 | infinity |
| HWB1 | INT OUT 2 | 0 | 1200 |
| HWB3 | INT OUT 1 | 200 | 400 |

Fig. 3

| Source | Activity Mode |
|--------|---------------|
| MODE1 | NON-ACTIVE |
| MODE2 | NON-ACTIVE |
| MODE3 | ACTIVE |
| MODE4 | NON-ACTIVE |

Fig. 4

INTERRUPT CONTROLLER AND METHODS OF OPERATION

TECHNICAL FIELD

The present invention relates to interrupt controllers and methods of operation.

BACKGROUND

Interrupts are commonly used when one hardware block or unit or a software block or routine (in the following also referred to as the "sender") requests the attention of another hardware block or unit or software block or routine (in the following also referred to as the "receiver"). A hardware block may refer to logic with or without one or several processors (also referred to as Central Processing Units, CPU).

For example, a first hardware block may request an interrupt of a second hardware block when the first hardware block has completed certain tasks and possibly has generated certain results. Upon receipt of the interrupt, the second hardware block can start processing the result of the first hardware block and thereafter complete its task.

A particular hardware block is a timer. The timer sends an interrupt to a hardware block after a set time has lapsed. Consequently, the hardware block may set a time when it knows that a certain task needs to be carried out and, upon receipt of the interrupt from the timer, switch to that task. In the meantime, the hardware block may carry out other functions.

When a hardware block which is in non-active mode, e.g. sleep mode, receives an interrupt, activities for waking-up the hardware block are initiated. A problem is that such wake-up usually has a cost in terms of time and energy. Similarly, the activities of the hardware block which are required going from active mode to non-active mode also has a cost in terms of time and energy.

SUMMARY

According to an aspect of the present invention, there is provided an interrupt controller, and a corresponding method, which, in the case the target hardware block for an interrupt is in non-active mode, is adapted to delay, as far as is acceptable, the interrupt. A hardware block receiving many interrupts may thereby be able to lump the servicing of a number of interrupts together to periods when it is in active mode.

According to a further aspect of the present invention, there is provided a method of transferring information from one task executed on a first hardware block to another task executed on a second hardware block. The method comprises providing the information in a memory accessible for the two tasks and using an interrupt controller to alert the receiving task. The interrupt of the second task is delayed if that task is run on a hardware block which is in non-active mode. A maximum delay time may be set when the second task has to be alerted independently whether the second hardware block still is in non-active mode.

BRIEF DESCRIPTION OF THE DRAWINGS

FIG. 3 shows a first table of data of an interrupt controller;
FIG. 4 shows a second table of data of an interrupt controller.

DETAILED DESCRIPTION

Figure 1:
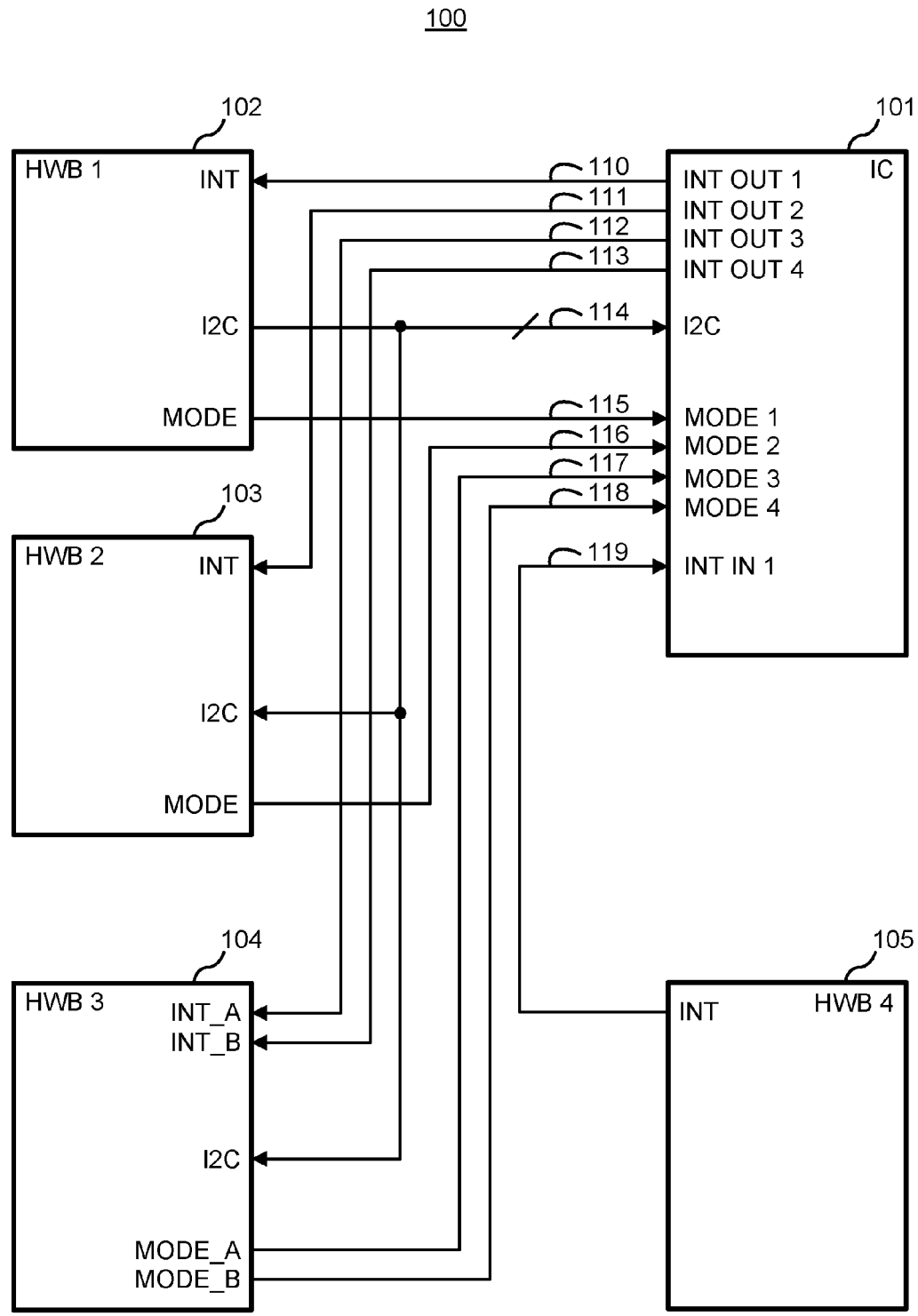
FIG. 1 shows an interrupt enabled system

Embodiments of the present invention are described below, by way of example only. It should be noted that details illustrated in the figures may not be drawn to scale. On the contrary, the dimensions of the details of the illustrations are chosen so as to improve the understanding of the present invention.

For the purpose of clarity, in the present document the expression "activity mode" is used in the widest possible scope. That is, the mode denoted "active" and the mode denoted "non-active" may represent any two differing activity modes known in the art. For example, the active mode may include such states as "executing" and "idle" and the "non-active" mode includes such states as "powered off" and "sleeping", as the skilled person will realize.

Hardware blocks often have different activity modes. Commonly, the hardware blocks support active and non-active modes. In active mode, the hardware block is executing or is ready to execute assigned tasks. When the hardware block is in active mode but without performing any useful tasks it is said to be idle. Power consumption in idle mode is noticeable due to static power consumption from current leakages in the hardware. For this reason it is often desirable to change the activity mode of a hardware block to a activity mode corresponding to as low power consumption as is possible depending on the presence of assigned tasks to be executed by the block. One such non-activity mode is what is often referred to as sleep mode. In this case, the hardware block is in a mode when execution of tasks cannot be performed, the result being that power consumption is reduced or substantially eliminated.

The activity mode of a hardware block may be set by an Operating System Scheduler which, when knowing that no tasks need to be executed for a certain period of time by a particular hardware block, may set a timer of an interrupt controller in order to generate an activating interrupt to the hardware block at the set time and direct the hardware block to enter a non-active mode. The set time may correspond to a point of time when the Operating System Scheduler expects tasks to be executed by the hardware block.

At the time of receiving an interrupt by a hardware block, activities for activating the hardware block from the non-active mode are initiated. Such activation usually has a cost in terms of time and energy. Similarly, the activities of the hardware block which are required going from a active mode to a non-active mode also has a cost in terms of time and energy.

In order to increase the density of components within hardware blocks the technology dimensions of semiconductor manufacturing processes continue to be reduced over time (e.g. from 65 nm line width to 45 nm and 22 nm and further). However, with smaller technology dimension the static energy leakage ratio of the total energy in the chip (e.g. within MOS transistors being in "off"-state) increases and consequently, more energy is wasted which converts into heat. The increased temperature of the chip, in its turn, further increases the static current leakage in the chip and, consequently even more energy is wasted. It is therefore important to concentrate the active time of a hardware block to short periods and, during other periods, enter non-active modes.

In these cases, non-active mode corresponds to a mode with reduced power consumption (also referred to as reduced power consumption mode).

In some case, such as for multimedia processing, it is common that several tasks are performed in series on data. The tasks have an input and produce an output. The output is then used as an input for the next task. Such chains of tasks can of course be more complex with a task having more dependencies on previous blocks (as well as none when it is first in the chain). These chains of tasks with dependencies are not limited to multi-media processing; other examples are layer 1 network signalling and decryption/encryption.

On systems having many hardware blocks it is very common that the tasks in the chain are deployed on different hardware blocks. This means that the information (e.g. data, control, meta-data etc) needs to be transferred between the sub-systems (e.g. CPUs, DSPs, GPUs, HW-video codec accelerators, etc.).

A hardware block enters non-active mode when it does not have anything to work on. The tasks on that hardware block will wait for information coming from up-stream tasks in the chain executing on another hardware block. But before entering the non-active mode it does not know when to return to active mode since it does not know when the up-stream task will be delivered.

The sending task can activate the hardware block immediately when it has something to deliver, but this might lead to that the receiving hardware block is often (unnecessarily) activated from its non-active mode and, consequently, will be forced to frequently go back and forth between a non-active mode and active mode. As explained above, this may lead to significant waste of time and energy in the hardware block.

Instead, the sending task can set a delayed interrupt that will activate the receiving hardware block at a particular time, provided it has not been activated before that time. This arrangement has the benefit that the requests from several tasks to process deliveries or tasks by a receiving hardware block can be carried out at times when the receiving hardware block has to be in active mode anyway, compared to when such deliveries or tasks, each of them, would have activated the receiving hardware block at the times the requests are generated (that is, direct interrupt handling).

The delay of the interrupt set by the requesting task should be set in accordance to when it latest is necessary to handle the information (deliveries or tasks). This means that, in the case several tasks have set delay times, the interrupt to the receiving hardware block should be delivered when the first delay time has expired. At the times the receiving hardware block is activated, it will process and/or service all interrupts that have been queued up, that is even if the delay times which have been set have not expired yet, before it is entering non-active mode again. As a result, the receiving hardware block will be activated more seldom but at the same time process and/or service the most urgent task in time.

According to a first exemplary embodiment of the present invention, FIG. 1 shows an interrupt enabled system 100. In this embodiment, an interrupt controller (IC) 101 is connected to first, second, third and fourth hardware blocks (HWB1, HWB2, HWB3, HWB4) 102, 103, 104 and 105, respectively.

The interrupt controller 101 is generating interrupt signals on interrupt outputs (labelled INT OUT 1, INT OUT 2, INT OUT 3 and INT OUT 4). These outputs are connected by means of connections 110, 111, 112, and 113 to the first hardware block 102 (input INT), the second hardware 103 block (input INT) and the third hardware block 104 (inputs INT_A and INT_B). An I2C bus connects the interrupt controller and the first, second and third hardware blocks (labelled 120). This is achieved by the connection 114. The first, second and third hardware blocks are provided with outputs (labelled MODE, MODE, MODE_A and MODE_B) on which each of the hardware blocks indicates the activity mode of the block. These outputs are connected by means of connections 115, 116, 117 and 118, respectively, to inputs on the interrupt controller (labelled MODE 1, MODE 2, MODE 3 and MODE 4, respectively). A hardware block may comprise a plurality of sub-hardware blocks which may be operating in different activity modes. This is illustrated by the third hardware block 104 which comprises two sub-hardware blocks. The first sub-hardware block has an interrupt input labelled INT_A and the second sub-hardware block has an interrupt input labelled INT_B. As the two sub-hardware blocks may operate in different activity modes, each sub-hardware block has its own output labelled MODE_A and MODE_B, respectively, on which they indicate their activity mode. The interrupt controller may also have dedicated interrupt inputs. Though they may exist in any number, one dedicated interrupt input, labelled INT IN 1 on the interrupt controller, is illustrated in the first exemplary embodiment. This input is connected to an interrupt output of a fourth hardware block (HWB4) 105 by means of connection 119.

Figure 2:
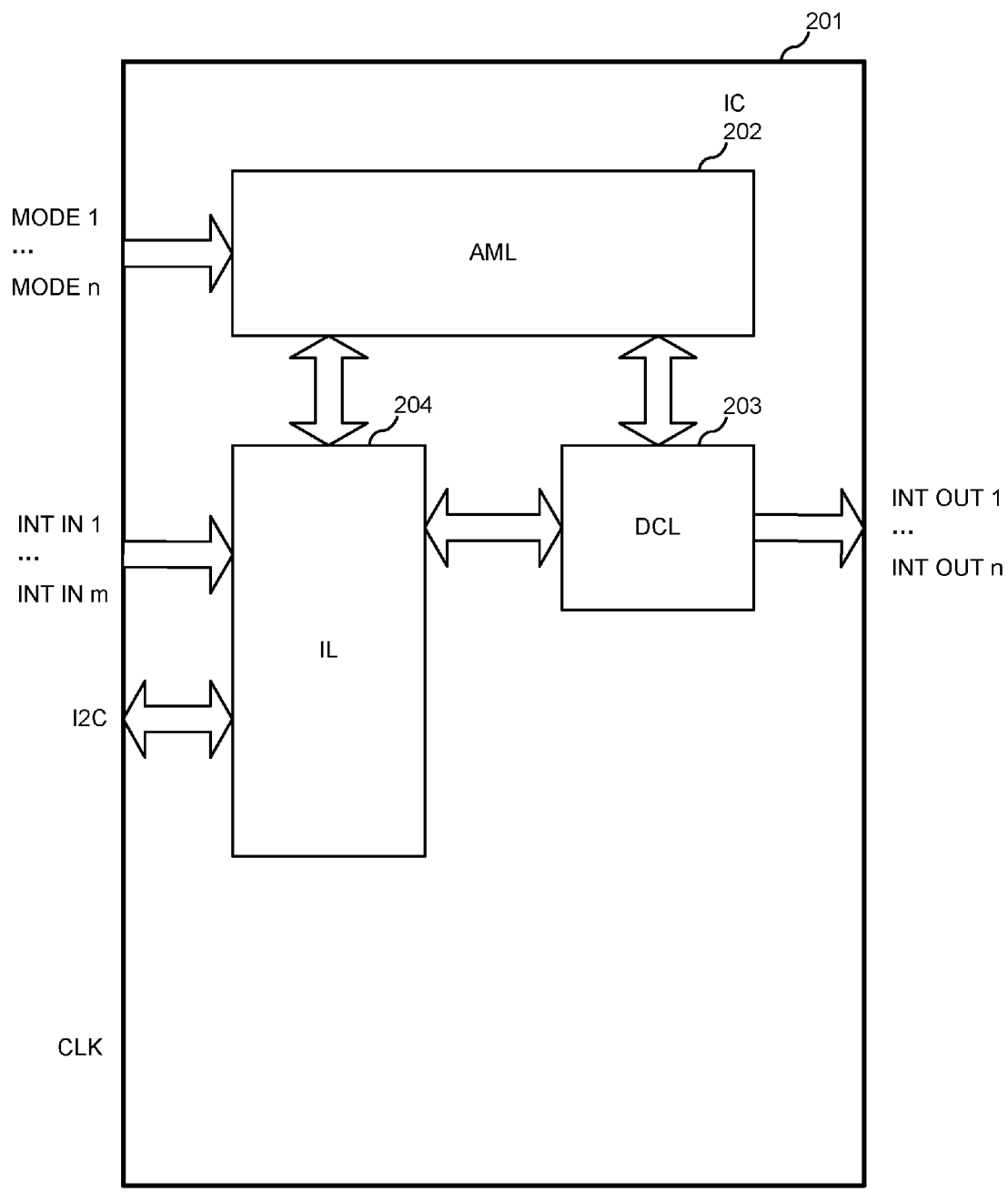
FIG. 2 shows a block diagram of an interrupt controller.

FIG. 2 shows a block diagram of an interrupt controller 201. The interrupt controller 201 is an exemplary interrupt controller which may be used as the interrupt controller 101 in FIG. 1. The input 120 and dedicated interrupt inputs INT IN 1 to INT IN m are connected to Interrupt Logic (IL) 204. The inputs MODE1 to MODEn, for connection to the activity mode outputs of the hardware blocks, are connected to an Activity Mode Logic (AML) 202. A Delay Control Logic (DCL) 203 is connected to the Activity Mode Logic 202, the Interrupt Logic 204 and also to the outputs INT OUT 1 to INT OUT n.

In alternative exemplary embodiments, the interrupt controller and the hardware blocks may be connected by any kind of communication means, for example, any kind of serial bus or a conventional parallel bus (having separate address, data and control busses).

It should be noted that in alternative exemplary embodiments, the interrupt controller may only be equipped with dedicated interrupt inputs for receiving the interrupts (that is, without other kinds of communication means such as a serial bus (e.g. I2C) or a conventional parallel bus). Similarly, in further alternative embodiments, the interrupt controller may not comprise such dedicated interrupt inputs at all for receiving the interrupts.

In operation, the interrupt controller communicates with the first, second and third hardware blocks by means of the I2C bus as is well known in the art. A hardware block (Example A: the first hardware block 102 of FIG. 1) may request the interrupt controller to generate an interrupt. The targeted hardware block of the interrupt request (Example A: the second hardware block 103), may automatically be set (e.g. set to be the requesting hardware block) or information of the targeted hardware block (Example A: hardware block 103) may be provided with the request. The interrupt controller receives information on when the interrupt at the latest needs to be generated. Also this information may be provided by the requesting hardware block or by any one of the hardware blocks. If the activity mode of the targeted hardware block currently is in active mode the Delay Control Logic will output the interrupt on one of the outputs, INT OUT 1 to INT OUT n (Example A: INT OUT 2 which is connected to the interrupt input INT of the second hardware block 103). If the activity mode of the targeted hardware block currently is in non-active mode the interrupt is not outputted until the activity mode of the targeted hardware block is active. If the interrupt controller has received information on when the interrupt at the latest needs to be generated, the Delay Control Logic will output the interrupt at that point of time independently on whether the hardware block is in non-active mode. Such an interrupt will activate the targeted hardware block. The Activity Mode Logic of the interrupt controller receives activity mode information from the hardware blocks on the inputs, MODE1 to MODEn (Example A: the information is received on input MODE2 which is connected to the output MODE on the second hardware block 103).

In the case of an interrupt request from the fourth hardware block, the operation is the same, except that the request will arrive to the interrupt controller on a dedicated interrupt input, INT IN 1, rather than through the I2C bus.

It should be noted that several requests for interrupts may be queued up in the interrupt controller when a targeted hardware block is in non-active mode. In the case when more than one of the requested interrupts comprise information on when at the latest the interrupt needs to be generated, the Delay Control Logic will output the interrupt to the relevant hardware block at the point of time when the earliest of the requested interrupts needs to be generated.

If requests for interrupts have been queued up in the interrupt controller for a targeted hardware block, the interrupt controller may generate a series of interrupts to that hardware block after it has been activated provided the set time (if any) after which the interrupt should be generated has lapsed or has been reached. In an alternative embodiment, the interrupt controller will generate a first interrupt to the relevant hardware block and then expect the hardware block to read out (e.g. by means of the I2C bus) any additional queued interrupts which are targeted for it and which are due.

In an alternative embodiment, the interrupt controller may be able to receive information that the interrupt should be generated after a set time. The set time may be fixed or it may be set by any one of the hardware blocks. In this case, the interrupt controller is adapted, in a manner well known in the art, to delay the interrupt until the set time has lapsed.

The interrupt controller may be provided with the ability for a hardware block to mask the generation of interrupts. In this case, a hardware block which has been activated by an interrupt may prevent further interrupts until it has completed more urgent tasks. The hardware block may then decide to enable new interrupts or communicate with the interrupt controller and read out queued interrupts targeted for it.

In an alternative embodiment, the interrupt controller may be provided with registers which keep track of the source of the interrupt requests.

In an alternative embodiment, FIG. 3 shows a first table of data which may be used in an interrupt controller according to the present invention as discussed with reference to FIG. 1 and FIG. 2 above. The data in the table illustrates an example of data. According to this example, the interrupt controller keeps track of the requesting hardware block in the column labelled "Source". In the column labelled "Target" the interrupt controller keeps track of the targeted hardware block, in this example, by means of the interrupt input which should be used by the interrupt controller when generating an interrupt signal to the targeted hardware block. In the fourth column, labelled "Min", the interrupt controller keeps track of the remainder of time (if any) it should wait until an interrupt normally should be generated. In the fourth column, labelled "Max", the interrupt controller keeps track of the remainder of the maximum time it should wait until an interrupt should be generated independently whether the targeted hardware block is in a non-active mode or not. In the example, the time of the third and fourth columns are given in milliseconds.

In the example of FIG. 3, according to the first row of the table, the first hardware block (HWB1) has requested an interrupt of the second hardware block (having its interrupt input connected to the INT OUT 2 output of the interrupt controller). The interrupt should not be generated until after 700 ms has passed but, if the second hardware block is in non-active mode, it could wait further but the interrupt has to be generated no later than after 900 ms. In the second row of the table, the first hardware block has requested an interrupt where the target hardware block is itself (having its interrupt input connected to the INT OUT 1 output of the interrupt controller). The interrupt should not be generated until after 300 ms has passed, but if the hardware block is in non-active mode, it may wait further (without any time set for the maximum waiting time). In the third row of the table, the first hardware block has requested an interrupt of the second hardware block (having its interrupt input connected to the INT OUT 2 output of the interrupt controller). The interrupt should be generated immediately but, if the second hardware block is in non-active mode, it could wait but the interrupt has to be generated no later than after 1200 ms. In the fourth row of the table, the third hardware block has requested an interrupt of the first hardware block (having its interrupt input connected to the INT OUT 1 output of the interrupt controller). The interrupt should not be generated until after 200 ms has passed, but if the hardware block is in non-active mode, it may wait but the interrupt has to be generated no later than after 400 ms.

In the case the first hardware block is in active mode, an interrupt signal will be generated on output INT OUT 1 after 200 ms (source: HWB3) and 300 ms (source: HWB1). In the case the first hardware block is in non-active mode, the shortest of the delay times (Max) is 400 ms set by the HWB3 and, consequently, in this case the interrupt signal will be generated on output INT OUT 1 after 200 ms.

In the case the second hardware block is in active mode, an interrupt signal will be generated on output INT OUT 2 immediately (source: HWB1) and after 700 ms (source: HWB1). In the case the second hardware block is in non-active mode, the shortest of the delay times (Max) is 900 ms and, consequently, in this case the interrupt signal will be generated on output INT OUT 2 after 900 ms.

In a further exemplary embodiment of the invention, FIG. 4 shows a second table of data which may be used by the interrupt controller. In this embodiment, the interrupt controller keeps track of the activity mode of the hardware blocks. In the first column "Source" the hardware blocks are identified by means of the inputs MODE 1 to MODE4 to which they are connected. In the second column "Activity Mode" the interrupt controller keeps track of the activity mode of the corresponding hardware blocks.

In the example of FIG. 4 the first and second hardware blocks are in non-active mode. The third hardware block comprises two blocks which, independently of each other, may enter different activity modes. The blocks also have independent interrupt inputs. The first of the blocks of the third hardware block is in active mode and the second of the blocks of the third hardware block is in non-active mode.

In this embodiment, the interrupt controller may not need separate inputs for receiving information on the activity mode of a hardware block. Instead, this information may be provided to the interrupt controller e.g. by means of the I2C bus. Alternatively, the interrupt controller is provided with a reference to a memory where this information is provided.

In an alternative embodiment, the interrupt controller may enable a hardware block to mask an interrupt, that is, disable the generation of an interrupt signal for the corresponding interrupt.

The interrupt handling function on the receiver may acknowledge/clear/reset the interrupt signal when it service or has serviced the interrupt.

The interrupts will be lumped together and serviced during periods when the interrupt receiver is in active state. Therefore, the interrupt controller may send all new incoming interrupts directly to the interrupt receiver when it is in active state. Also, as soon as the interrupt receiver goes into active state (irrespective of the reason for the activation) all the queued interrupts are sent from the interrupt controller. Alternatively, the interrupt receiver interrogates the interrupt controller after the first interrupt whether interrupts are queued up and manages these accordingly.

It should be understood that the functionality of the interrupt controller may be implemented by logic (including by means of a processor and software) as is well known in the art. The interrupt controller may be implemented together with other hardware blocks. Furthermore, portions and/or functionalities of the interrupt controller may be integrated in various hardware blocks. For example, the first and second tables may be implemented in a memory of the interrupt controller or a memory external to the hardware block of the interrupt controller. Additionally, instead of tables, the functionality of the interrupt controller may be implemented by means of logic, registers, counters, processors etc. The interrupt controller may implement the functionality of the timers (compare the functionality of the time in the columns "Min" and "Max" in FIG. 3) in any possible way, including common or separate clock-pulse counters (counting up and/or down), time-stamps or pointers, time measuring units external from the interrupt controller etc.

The interrupt controller of the present invention may also be used on a task level executing on the hardware block/processor. This may be used if a task that wants to transmit information to a task on another hardware block has got knowledge about when that information needs to be handled by the receiver. Such knowledge may come from a supervising task that knows the dependencies between tasks on several sub-systems, and/or that knows the deadlines for the whole chain, etc. It can also come from a convention on the latency on a single transmission or from negotiated transmission latency.

Figure 5:
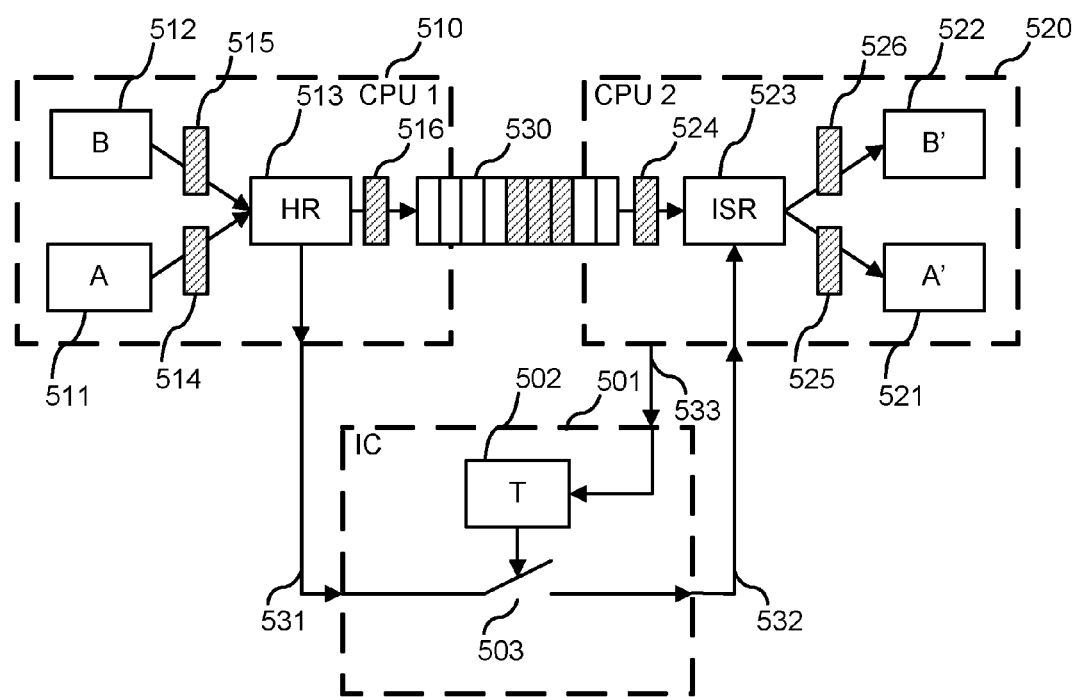
FIG. 5 shows an interrupt enabled system.

FIG. 5 shows an interrupt enabled system which exemplifies transferring of information between tasks executed on different hardware blocks. In this example, for illustrative purpose, all the tasks on one hardware block will use the same interrupt signal to the other hardware block. Assume that a first task (labelled A) 511 and a second task (labelled B) 512 of a first hardware block (labelled CPU1) 510 wants to transfer information elements 514 and 515, respectively, to a first task (labelled A') 521 and a second task (labelled B') 522 of a second hardware block 520 (labelled CPU2). The information elements are indicated by hashed boxes in FIG. 5. The information elements 514 and 515 are forwarded to a Helper Routine (labelled HR) 513 which places corresponding information elements 516 on a queue 530. The queue is a memory element common to the first and second hardware blocks. The Helper Routine may or may not add information to the information elements before they are placed in the queue. Such added information may be information identifying the "sending" task. In order to alert a "receiving" task that an information element destined for it has been placed in the queue, the Helping Routine requests an interrupt of the second hardware block. This is done by means of an Interrupt Controller (labelled IC) 510. An Interrupt Controller in accordance with the embodiments discussed above may be used. The request is communicated to the Interrupt Controller over a first connection 531 together with information on whether the interrupt should be generated after a specified time and whether the interrupt could be generated even later if the second hardware block is in non-active mode. In the latter case, the latest time when it has to be generated independent on the activity mode of the receiving hardware block could also be provided.

In the case the interrupt should be generated after a specified time, this is kept track of by a timer (labelled T) 502 of the Interrupt Controller. The timer also receives information on the activity mode of the second hardware block over the second connection 533. In the case the interrupt could be generated even later depending on whether the second hardware block is in non-active mode, the timer keeps track of such delay. The control of the generation of interrupt signals to the second hardware block is symbolically illustrated by the "switch" 503. An interrupt signal is provided over a third connection 532 to the second hardware block.

At the time the second hardware block receives the interrupt from the interrupt controller, an Interrupt Service Routine 523 picks up the relevant queued information elements 524 and forwards them to the correct receiving tasks. This may be done by information available in the information element 524 or a receiving task may know how to identify information elements destined to it. The information elements read-out from the queue are illustrated by information element 525 destined for the first task (labelled A') and information element 526 destined for the second task (labelled B') of the second hardware block.

When the receiver starts to service the interrupt it will read the queued information elements and will continue to read elements until the queue is empty. The receiver may acknowledge the interrupt when it starts serving the interrupt. Additionally, the receiver may mask incoming interrupts from the same source while emptying the queue, since it will anyway empty the queue before stop serving the interrupt.

It should be noted that the tasks on the sending hardware block may operate independent of each other; likewise the tasks on the receiving hardware block may operate independently. The queued information elements may contain the real data or they may only reference to the real data for example by a link or an address. Furthermore, the transfer between two tasks could use any additional queue mechanism on top of the transport mechanism discussed above. For example, the tasks may have a private FIFO queue for their data and utilize the transport mechanism to inform the other component that there is new data available. In this case, the transport mechanism queue is for the transport of information, whereas the private FIFO queue can for example be used for buffers that need to be processed by the receiving task. It should be noted that the queue does not have to be an arranged queue. Other ways of reading the data from the queue could be applicable, such as FIFO, LIFO, random order, priority order, time-out order, etc.

Figure 6:
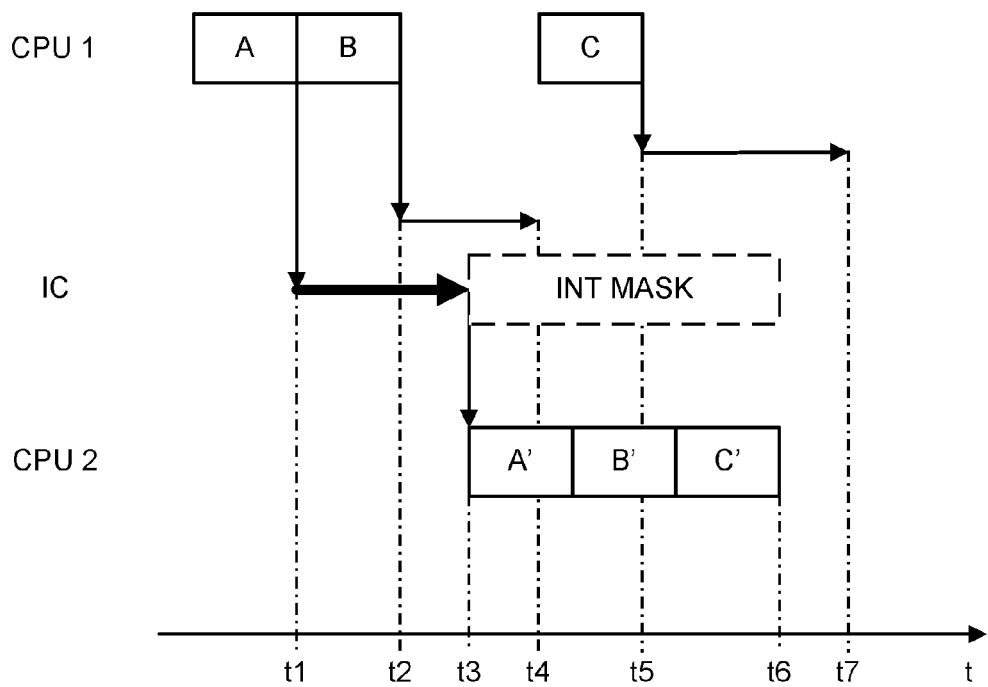
FIG. 6 illustrates a first example of delayed interrupts.
Figure 7:
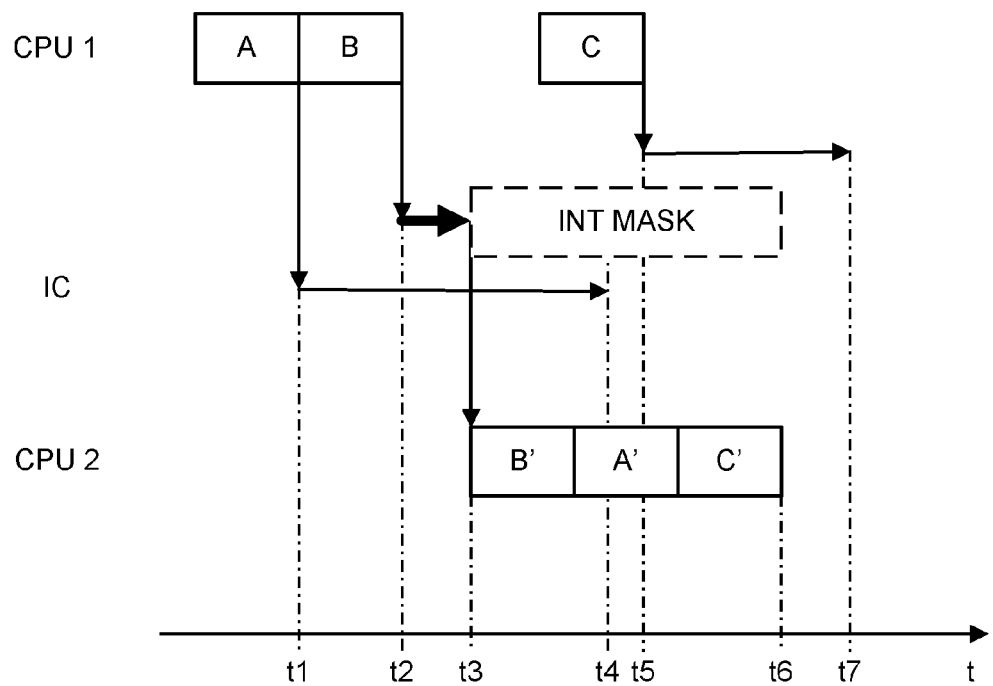
FIG. 7 illustrates a second example of delayed interrupts.
Figure 8:
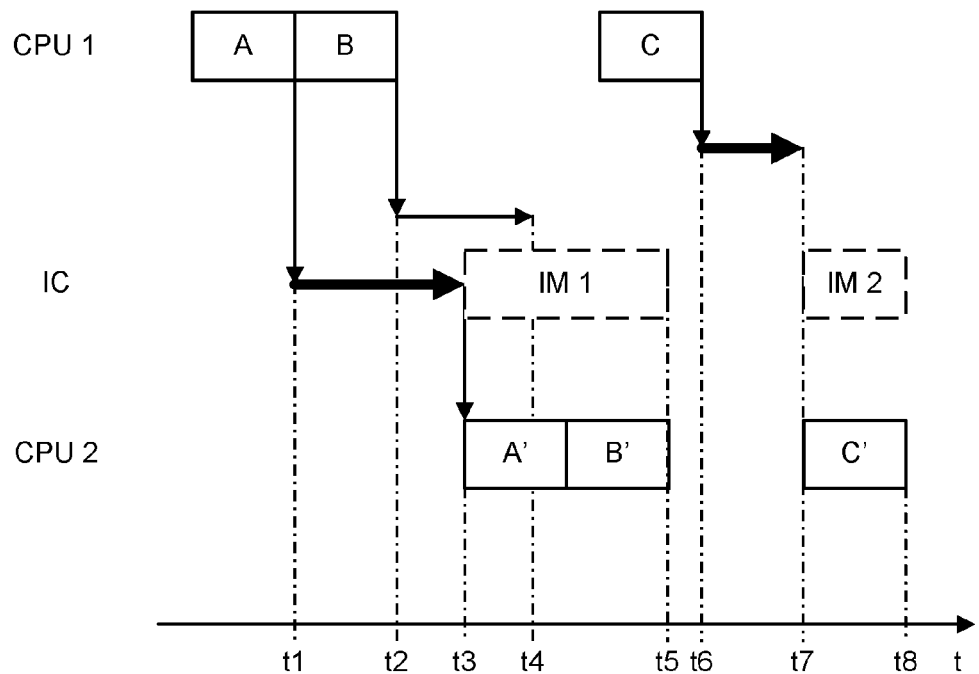
FIG. 8 illustrates a third example of delayed interrupts.

FIG. 6 to FIG. 8 illustrate examples of operation of delayed interrupts. The blocks (labelled with A, B and C) horizontally to "CPU1" refer to sending tasks of a first hardware block. Similarly, the blocks (labelled with A', B' and C') horizontally to "CPU2" refer to receiving tasks of the second hardware block. The boxes and arrows horizontally to "IC" refer to the operation of the Interrupt Controller. The horizontal axis labelled "t" is a time axis. Vertical arrows illustrate interrupt or interrupt requests. Horizontal arrows illustrate the time the interrupt could be delayed in the case the second hardware block is in non-active mode. Furthermore, it is assumed that the second hardware block (CPU2) is in non-active mode unless activated by interrupts illustrated in the figures.

FIG. 6 illustrates a first example of delayed interrupts. At the time t1, task A of CPU1, with an aim to alert task A', requests an interrupt of CPU2 and indicates that the interrupt has to be generated at the time t3 at the latest should CPU2 be in non-active mode. At the time t2, task B of CPU1, with an aim to alert task B', requests an interrupt of CPU2 and indicates that the interrupt has to be generated at the time t4 at the latest should CPU2 be in non-active mode. The earliest of the times (earliest of t3 and t4) when the interrupt has to be generated at the latest is t3. Consequently, the interrupt controller generates an interrupt at t3 which will wake-up CPU2 and thereby allowing task A' to start execution. This is indicated by the vertical arrow at t3. In this example, as is illustrated by "INT MASK", CPU2 masks, i.e. prevents further interrupts until it has completed its processing and is ready to go back to non-active mode. During this processing of CPU2, it will also service any other pending interrupts. In this example, CPU2 will notice that there is a pending interrupt from task B which then will be serviced during the wake-up period. At the time t5, while CPU2 is awake, an interrupt request is made by task C. As this interrupt request occurs while CPU2 is awake, it too will be serviced before the wake-up period comes to an end (at t6), even if the interrupt requested by task C could have been delayed until t7 (at the latest). Before going back to non-active mode, CPU2 enables interrupts by no longer masking the interrupts.

FIG. 7 illustrates a second example of delayed interrupts. This example differs from the first example discussed above together with FIG. 6 in that the interrupt requested by task B has to be generated at the latest at the time t3 which is earlier than the time t4 when the interrupt requested by task A has to be generated at the latest. Consequently, in this example it is the interrupt requested by task B that will be decisive as to when CPU2 is woken up, which is at the time t3. Similar to the first example, CPU2 will mask further interrupts and will service the interrupt requested by task A, and the interrupt requested by task C during the wake-up, before re-entering into a non-active mode (at the time t6).

FIG. 8 illustrates a third example of delayed interrupts. This example differs from the first example discussed above together with FIG. 6 in that CPU2 has serviced the pending interrupts from task A and B at the time t5 and consequently enables interrupts again and goes back to non-active mode. As the interrupt request by task C now happens at the time t6, which is after the time t5 CPU2 goes back to non-active mode, the request by task C will not be serviced until the following time CPU2 wakes up. In the example, this will happen at the time t7, that is, at the time the request for interrupt has to be generated at the latest. Again, after servicing the interrupt requested by task C, CPU2 goes back to non-active mode at the time t8.

Figure 9:
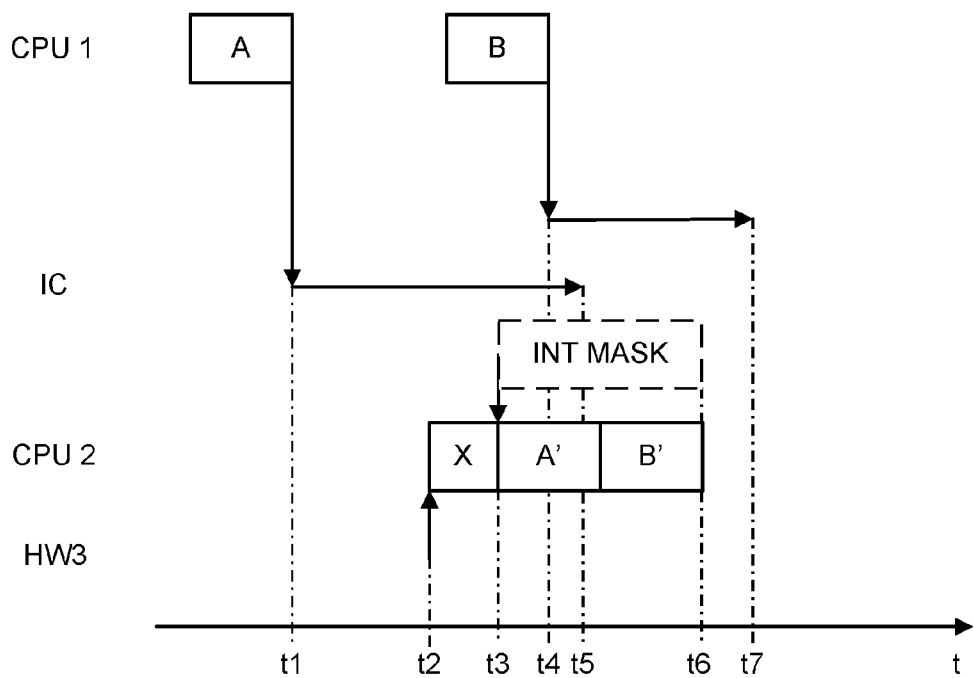
FIG. 9 illustrates a fourth example of delayed interrupts.

FIG. 9 illustrates a fourth example of delayed interrupts. At the time t1, task A of CPU1, with an aim to alert task A', requests an interrupt of CPU2 and indicates that the interrupt has to be generated at the time t5 at the latest should CPU2 be in non-active mode. At the time t2 a third hardware block, which is indicated by "HW3" in FIG. 9 wakes up CPU2. After having completed the task indicated by X in FIG. 9, the CPU2 masks further interrupts and notices that there is a pending interrupt from task A which then will be serviced. While doing so, task B requests interrupt and as CPU2 is already woken up it will also service this interrupt before going back to non-active mode (at the time t6), even if the interrupt requested by task B could have been generated as late as at the time t7. Before going back to non-active mode, CPU2 again enables interrupts.

Figure 10:
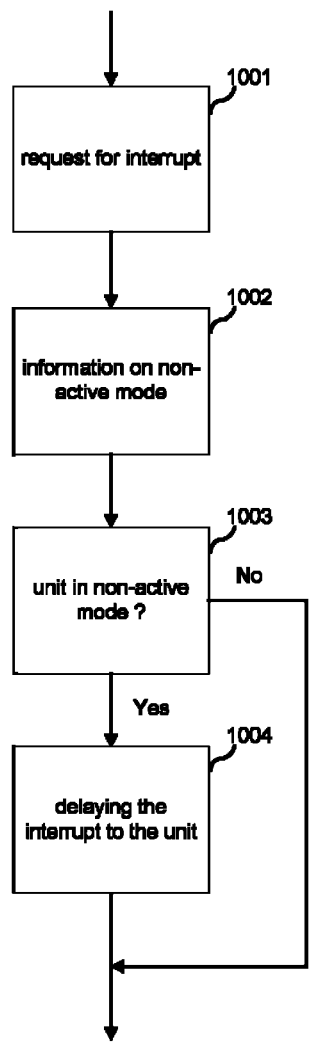
FIG. 10 shows a flow-diagram of a first method of operation.

FIG. 10 shows a flow-diagram of a first method of operation exemplifying a method of delaying interrupts according to the present invention. In the first step 1001 the interrupt controller is receiving a request for interrupt of an unit. In a second step 1002, the interrupt controller is receiving information indicative of whether the unit is in non-active mode. Thereafter, illustrated by steps 1003 and 1004 the interrupt controller is delaying the interrupt to the unit if the unit is in non-active mode.

Figure 11:
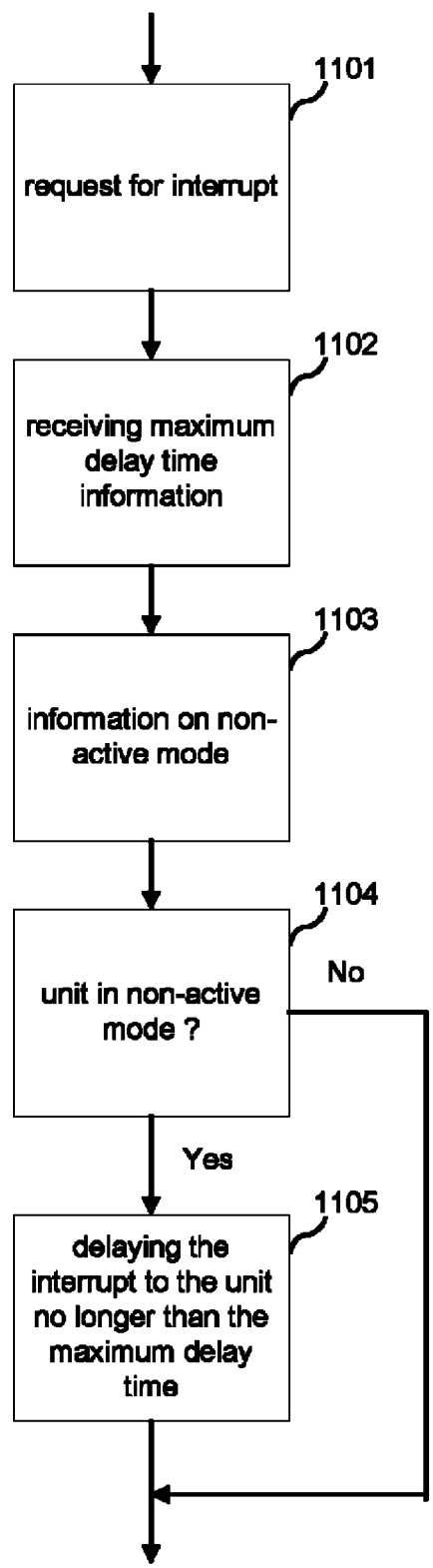
FIG. 11 shows a flow-diagram of a second method of operation.

FIG. 11 shows a flow-diagram of a second method of operation exemplifying a method of delaying interrupts according to the present invention. In the first step 1101 the interrupt controller is receiving a request for interrupt of an unit. In a second step 1102 the interrupt controller is receiving maximum delay time information representative of the length of time the interrupt signal to the unit at most should be delayed. Thereafter, illustrated by steps 1104 and 1105 the interrupt controller is delaying the interrupt to the unit if the unit is in non-active mode however no longer than the maximum delay time (that is, independently whether the received information indicates that the unit is in non-active mode).

Figure 12:
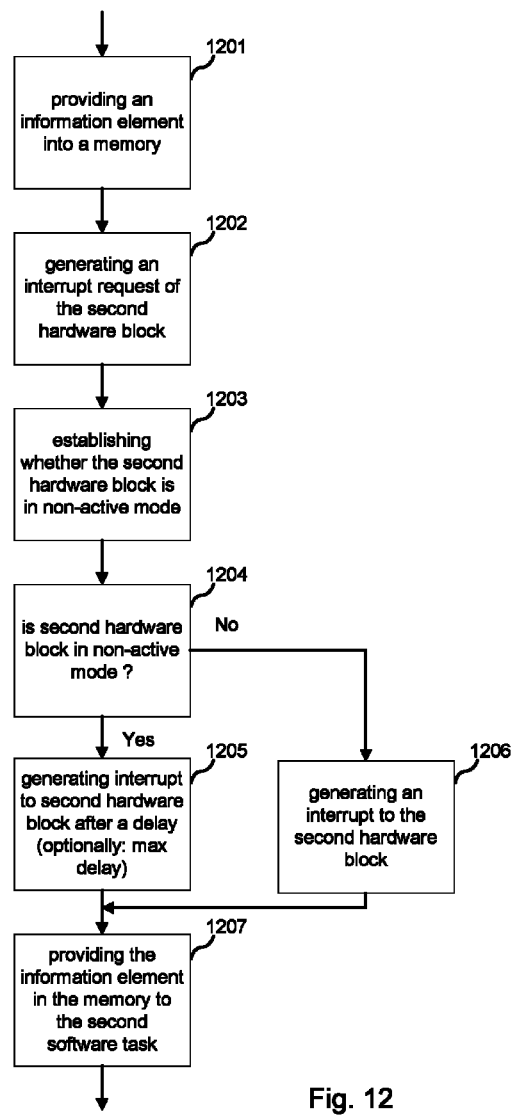
FIG. 12 shows a flow-diagram of a third method of operation.

FIG. 12 shows a flow-diagram of a third method of operation exemplifying transferring data from a first software task executed on a first hardware block to second software task executed on a second hardware block according to the present invention. The second hardware block may enter at least an active mode and a non-active mode. In a first step 1201, the interrupt enabled system is providing an information element into a memory. In a second step 1202, initiated by the first software task, the system is generating an interrupt request of the second hardware block. In a third step 1203, the interrupt controller of the system is establishing whether the second hardware block is in non-active mode. Thereafter, illustrated by steps 1204 and 1205, if the second hardware block is in non-active mode, the interrupt controller is generating an interrupt to the second hardware block after a delay. However, illustrated by steps 1204 and 1206, if the second hardware block is not in non-active mode, the interrupt controller is generating an interrupt to the second hardware block. Thereafter, in step 1207, the system is providing the information element in the memory to the second software task.

Usage of an interrupt controller as disclosed above is only examples of how the delayed interrupt and transport can be implemented (e.g. using a shared memory system). It should be noted that other implementations may be used such as the use of a separate mechanism to wake the other sub-system after a certain period and having a transport queue mechanism included in that hardware block.

The present invention is not limited to the situation where one hardware block is requesting another hardware block to wake up. The receiving processor may have dependencies to tasks on several other hardware blocks, which by this arrangement will have their interrupt handling synchronized with the earliest deadline. Also the present invention is not limited to the situation where tasks are operating or executed in chains.

An advantage of the invention is that lower energy consumption is achieved due to that interrupts are concentrated in time and several interrupts can be handled in the same wake-up cycle. This is done while maintaining deadlines for handling tasks without needing to resort to direct interrupt handling.

The invention claimed is:

1. An interrupt controller for providing interrupt signals to one or more units for interrupting those units, each unit capable of entering an active mode or a non-active mode, said interrupt controller comprising:
   interrupt logic circuitry configured to receive a request for interrupt of one of said units;
   activity mode logic circuitry configured to receive information regarding whether the unit is in non-active mode; and
   delay control logic circuitry configured to delay the requested interrupt to the unit if said received information indicates that the unit is in non-active mode;
   wherein at least one of:
   (A) the interrupt logic circuitry is configured to receive maximum delay time information that is representative of the maximum length of time the delay control logic circuitry can delay the requested interrupt to the unit, and the delay control logic circuitry is configured to delay the requested interrupt no longer than said maximum length of time, irrespective of whether the received information indicates the unit is in non-active mode; and
   (B) the interrupt logic circuitry is configured to receive minimum delay time information that is representative of the minimum length of time the delay control logic circuitry must delay the requested interrupt to the unit, once the received information indicates the unit is in non-active mode.

2. The interrupt controller according to claim 1, wherein the interrupt logic circuitry is configured to receive information regarding masking interrupts requested from certain units and to prevent interrupts from being provided to the unit if those interrupts were requested by said certain units.

3. The interrupt controller according to claim 1, wherein the interrupt controller comprises an inter-integrated circuit (I2C) interface for receiving the request for interrupt.

4. The interrupt controller according to claim 1, wherein the interrupt controller comprises at least one interrupt input for receiving the request for interrupt.

5. The interrupt controller according to claim 1, wherein the interrupt logic circuitry is configured to provide information to the delay control circuitry regarding said request for interrupt of said unit.

6. The interrupt controller according to claim 1, wherein the delay control logic circuitry is configured to delay the requested interrupt to the unit until said information indicates that the unit is in active mode.

7. The interrupt controller according to claim 1, wherein, in active mode, a unit is executing or is ready to execute assigned tasks, and, in non-active mode, a unit is neither executing nor ready to execute assigned tasks.

8. The interrupt controller according to claim 1, wherein active mode comprises either an executing state or an idle state, and wherein non-active mode comprises either a powered-off state or a sleeping state.

9. A method of delaying interrupts comprising:
   receiving a request for interrupt of an unit;
   receiving information indicative of whether the unit is in non-active mode;
   delaying the requested interrupt to the unit if the unit is in non-active mode; and
   at least one of:
   (A) receiving maximum delay time information representative of the maximum length of time the requested interrupt to the unit can be delayed, and delaying the requested interrupt to the unit no longer than said maximum length of time, irrespective of whether the received information indicates that the unit is in non-active mode; and
   (B) receiving minimum delay time information representative of the minimum length of time the interrupt to the unit must be delayed once the received information indicates the unit is in non-active mode, and delaying the interrupt to the unit at least said minimum length of time once the received information indicates the unit is in non-active mode.

10. The method according to claim 9, wherein said delaying comprises delaying the requested interrupt to the unit until said information indicates that the unit is in active mode.

11. The method according to claim 9, wherein, in active mode, the unit is executing or is ready to execute assigned tasks, and, in non-active mode, the unit is neither executing nor ready to execute assigned tasks.

12. The method according to claim 9, wherein active mode comprises either an executing state or an idle state, and wherein non-active mode comprises either a powered-off state or a sleeping state.

13. A method of transferring data from a first software task executed on a first hardware block to a second software task executed on a second hardware block, wherein the second hardware block is capable of entering an active mode or a non-active mode, the method comprising:
   storing an information element in a memory;
   generating, upon initiation of the first software task, a request for interrupt of the second hardware block;
   determining whether the second hardware block is in non-active mode;
   if it is determined that the second hardware block is in non-active mode, generating, after a delay, an interrupt signal for interrupting said second hardware block responsive to said request, wherein the delay has a set value representing the maximum time the delay should last independently of whether the second hardware block is in non-active mode; and
   providing, after generation of the interrupt signal, the information element in the memory to the second software task.

14. The method according to claim 13, wherein the delay lasts as long as the second hardware block is in non-active mode.

15. The method according to claim 13, wherein, in active mode, the second hardware block is executing or is ready to execute assigned tasks, and, in non-active mode, the second hardware block is neither executing nor ready to execute assigned tasks.

* * * * *

UNITED STATES PATENT AND TRADEMARK OFFICE
CERTIFICATE OF CORRECTION

| | | |
|---|---|---|
| PATENT NO. | : 8,566,493 B2 | Page 1 of 1 |
| APPLICATION NO. | : 13/063674 | |
| DATED | : October 22, 2013 | |
| INVENTOR(S) | : Gustafsson et al. | |

It is certified that error appears in the above-identified patent and that said Letters Patent is hereby corrected as shown below:

In the Specification

In Column 4, Lines 5-6, delete "(labelled 120)." and insert -- (labelled I2C). --, therefor.

In Column 4, Line 32, delete "input 120" and insert -- input I2C --, therefor.

Signed and Sealed this
Eighteenth Day of March, 2014

Michelle K. Lee
*Deputy Director of the United States Patent and Trademark Office*